(12) United States Patent
Kato

(10) Patent No.: US 6,610,359 B2
(45) Date of Patent: Aug. 26, 2003

(54) CERAMIC FOAM AND PROCESS FOR PRODUCING THE SAME

(75) Inventor: Takayuki Kato, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/912,339

(22) Filed: Jul. 26, 2001

(65) Prior Publication Data

US 2002/0012796 A1 Jan. 31, 2002

(30) Foreign Application Priority Data

Jul. 27, 2000 (JP) .......................... 2000-226842

(51) Int. Cl.[7] .............. B05D 7/00; B05D 3/02; B05D 3/12
(52) U.S. Cl. ............... 427/212; 427/215; 427/244; 427/376.2; 427/346
(58) Field of Search ............... 427/376.2, 212, 427/215, 244, 346

(56) References Cited

U.S. PATENT DOCUMENTS 5,880,045 A * 3/1999 Cao et al. .................. 501/73

FOREIGN PATENT DOCUMENTS

JP       10-297977    11/1998

* cited by examiner

Primary Examiner—Michael Barr
(74) Attorney, Agent, or Firm—Armstrong, Westerman & Hattori, LLP

(57) ABSTRACT

A ceramic foam consisting of two layers in and out, in which a highly pure ceramic shell covers up the surface layer of the fly ash, is provided along with a process for producing such a ceramic foam. The process for producing a ceramic foam 10 includes the steps of: coating the surface of raw fly ash material containing impurities 12 with alumina slurry; granulating the coated fly ash; and sintering the granulated fly ash in a manner that the granulated fly ash is heated in a furnace with raising temperature, then kept at a predetermined temperature for several hours and then, slowly cooled down to room temperature. The impurities are sealed inside the fly ash 11 not to transfer to the outside so that the surface of the fly ash is covered up with a ceramic shell 13 to form the ceramic foam 10 having two layers in and out.

7 Claims, 2 Drawing Sheets

CERAMIC FOAM AND PROCESS FOR PRODUCING THE SAME

BACKGROUND OF THE INVENTION (1) Field of the Invention

The present invention relates to a ceramic foam, which is produced starting from fly ash discharged from a thermal power plant and the like or pulp sludge discharged from a paper mill as main raw materials thereof and is applied to a light aggregate for concrete, and process for producing the same.

(2) Description of the Related Art

In a thermal power plant in which coal is used for boiler fuel, a large quantity of fly ash is discharged as the industrial waste. Recently, such a fly ash has been effectively used as a ceramic aggregate for concrete of building materials. The fly ash is further expected to be put to practical use as reclaimed resources of a large quantity, which is free from care of being exhausted for the time being, as well as the pulp sludge.

For example, Japanese Patent Application Laid-Open No. H10-297977 discloses a technique that powder such as aluminum oxide (alumina) powder is bound to the surface of fly ash followed by sintering so as to produce a hollow ceramic foam.

FIGS. 3A and 3B are a cross sectional view schematically illustrating a ceramic foam 1 before and after sintering, respectively, which is produced by such a conventional process as disclosed in the Japanese Patent Application Laid-Open No. H10-297977. As shown in FIG. 3A, ceramic powder 4 such as $Al_2O_3$, $MgO$ and $SiO_2$ powder is coated on the surface layer of fly ash 2 containing impurities 3 such as $Fe_2O_3$ followed by granulation so as to form a ceramic powder layer. In a sintering step after the granulation, the granulated fly ash is sintered at 1100–1300° C., thereby a ceramic foam 1 having low density and high mechanical strength is produced.

The ceramic foam 1 thus produced according to the conventional process has the following disadvantage.

That is, when the fly ash 2 is coated with the ceramic powder 4 on the surface layer thereof, then granulated and then, sintered, as shown in FIG. 3B, the impurities 3 (such as $Fe_2O_3$) contained in the fly ash 2 transfer to the ceramic powder 4 and fuses together with the ceramic powder 4. As a result, a desired ceramic foam, i.e. a hollow particle consisting of two layers in and out, in which a highly pure ceramic shell covers up the surface layer of the fly ash, cannot be produced.

SUMMARY OF THE INVENTION

It is therefore an objective of the present invention to solve the above problem and to provide a high quality ceramic foam consisting of two layers in and out, in which a highly pure ceramic shell covers up the surface layer of the fly ash, and a process for producing such a ceramic foam.

In order to attain the above objective, the present invention is to provide a ceramic foam having two layers in and out consisting of: an inner layer of hollow fly ash part produced by a process, in which raw fly ash material containing impurities is coated with alumina slurry on the surface thereof, then granulated and then, sintered; and an outer layer of a ceramic shell part produced by said process covering up the surface of the hollow fly ash part.

According to the constitution described above, a ceramic foam as a high quality hollow particle consisting of two layers in and out, in which a ceramic shell covers up the surface layer of the hollow fly ash, can be provided.

In order to attain the above objective, the present invention is also to provide a process for producing a ceramic foam comprising the steps of: coating the surface of raw fly ash material containing impurities with alumina slurry; granulating the coated fly ash; and sintering the granulated fly ash in a manner that the granulated fly ash is heated in a furnace with raising temperature, then kept at a predetermined temperature for several hours and then, slowly cooled down to room temperature, whereby the impurities are sealed inside the fly ash not to transfer to the outside so that the surface of the fly ash is covered up with a ceramic shell to form the ceramic foam having two layers in and out.

According to the process described above, the impurities contained in the fly ash are prevented from transferring to the alumina slurry, which is coated on the outer surface of the fly ash, and sealed inside the fly ash. As a result, a ceramic foam as a hollow particle consisting of two layers in and out, in which a ceramic shell uniformly covers up the surface of the hollow fly ash, can be provided.

Preferably, in the step of sintering, a rate of the heating is 5° C./minute, the predetermined temperature ranges from 1350° C. to 1460° C., the several hours is three hours, and a rate of the slow cooling is 5° C./minute.

According to the process described above, the impurities contained in the fly ash are prevented from transferring to the alumina slurry and from fusing together with the alumina slurry.

Preferably, air is introduced into the furnace with the amount of 100 mL/minute per amount of the granulated fly ash 2.0 g in the step of sintering.

According to the introduction of air with the appropriate amount as described above, a process in which the alumina slurry forms the ceramic shell can be effectively promoted.

Preferably, the alumina slurry has a composition consisting of 65–70 wt % of aluminum oxide, 2–3 wt % of ammonium polycarboxylate as a dispersing agent, 2–3 wt % of acrylic emulsion as a binder, and 25–30 wt % of ion exchanger.

By setting up the composition of the alumina slurry as described above, the ammonium polycarboxylate as a dispersing agent prevents the alumina slurry particles from agglomerateing with each other, the acrylic emulsion as a binder promotes the sintering of the alumina powder, and the ion exchanger acts as a solvent of the alumina slurry, thereby the desired ceramic foam as a hollow particle in accordance with the particle design.

DESCRIPTION OF THE PREFERRED EMBODIMENTS

In the following, a ceramic foam and a process for producing the same according to the preferred embodiments of the present invention will be explained with reference to the attached drawings.

Figure 1:
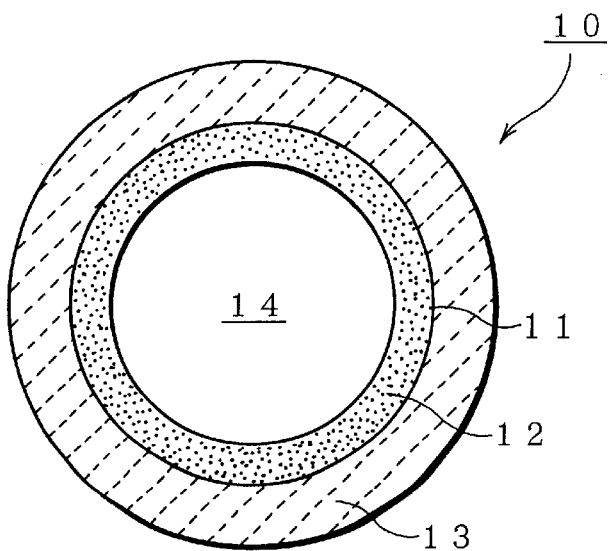
FIG. 1 is a cross sectional view schematically illustrating a ceramic foam produced by a process according to a preferred embodiment of the present invention.

FIG. 1 is a cross sectional view schematically illustrating a ceramic foam 10 produced by a process according to a preferred embodiment of the present invention. Fly ash 11, which may contain a hollow space 14, is prepared as the main raw material and alumina slurry in which aluminum oxide (alumina) is subjected to slurrying is also prepared. To prepare and use the alumina slurry for producing a ceramic foam in the present invention is different from that alumina powder is used in a conventional technique. The fly ash 11 is coated with thus prepared alumina slurry on the surface thereof and then granulated. In order to uniformly coat the alumina slurry on the surface of the fly ash 11, the alumina slurry has the following composition. A dispersing agent such as ammonium polycarboxylate, a binder such as acrylic emulsion, and ion exchanger such as ion exchange water and organic solvent are added to alumina powder, thereby the alumina slurry based on a particle design is prepared.

Two to three wt %, preferably 3 wt %, of ammonium polycarboxylate as a dispersing agent is added to 65–70 wt %, preferably 65 wt %, of aluminum oxide. The addition of the ammonium polycarboxylate improves the dispersibility of the aluminum oxide particles in the alumina slurry. Then, 2 to 3 wt %, preferably 2 wt %, of acrylic emulsion as a binder is added thereto. The addition of the acrylic emulsion improve the sintering property of the aluminum oxide. Further, 25–30 wt %, preferably 30 wt % of ion exchange water is added thereto. The addition of the ion exchange water allows the dispersing agent and the binder to spread over every surface of the aluminum oxide powder, thereby promoting the formation of the alumina layer on the fly ash. The weight ratio of the fly ash to the aluminum oxide is set up, for example, 2 to 3.

Figure 2:
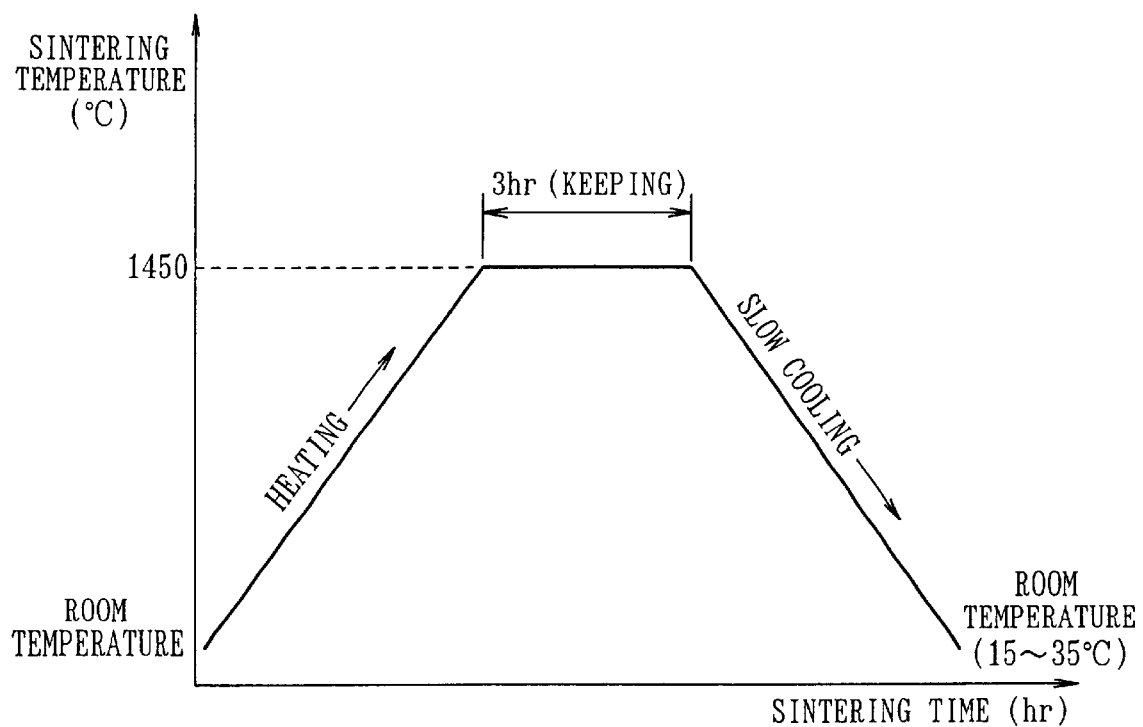
FIG. 2 is a graph illustrating a relation between sintering temperature and sintering time in a preferred embodiment of the present invention.
Figure 3A:
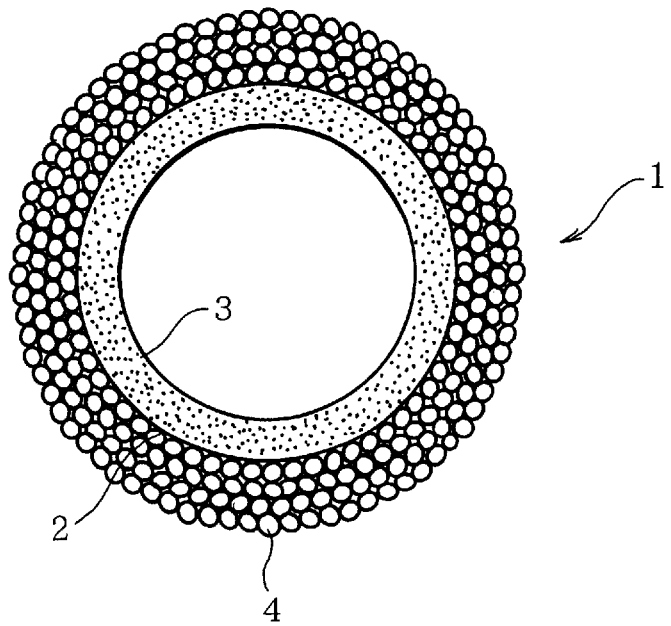
FIG. 3A is a cross sectional view schematically illustrating a ceramic foam before sintering produced by a conventional process.
Figure 3B:
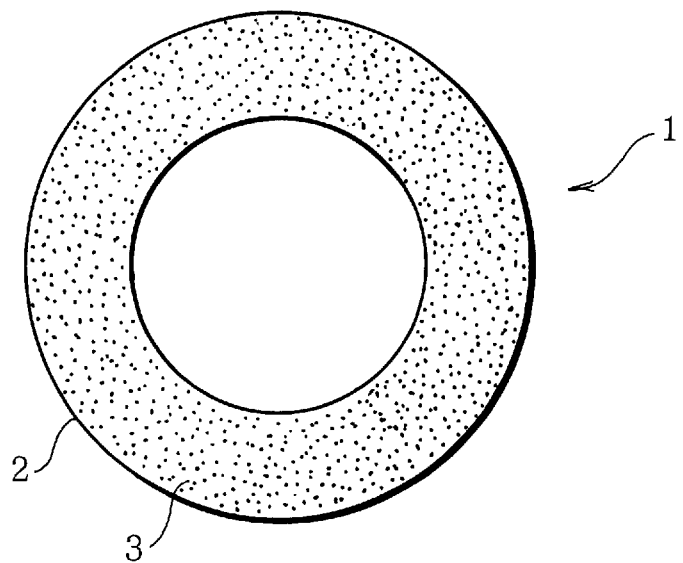
FIG. 3B is a cross sectional view schematically illustrating a ceramic foam after sintering produced by a conventional process.

The fly ash is coated with the alumina slurry described above, then granulated and then, dried at about 25° C. Then, the dried granulated particles are sintered in an electric furnace. FIG. 2 is a graph illustrating a relation between the sintering temperature and sintering time. That is, the sintering condition is as follows.

Normally, the dried granulated particles are heated with a low heating rate of 5° C./minute from room temperature (15 to 35° C.) to a temperature ranging from 1350° C.–1460° C.

When the temperature reaches, for example, 1450° C., the granulated particles is kept heated at 1450° C. for about three hours.

Thereafter, the granulated particles are cooled down to room temperature with a low cooling rate of 5° C./minute.

Thus, the dried granulated particles are slowly heated, then kept heated for a predetermined period of time and then, slowly cooled down, thereby the alumina slurry is prevented from fusing together with the fly ash 11. Therefore, in contrast to the conventional process, the impurities 12 contained in the fly ash 11 are prevented from transferring to the alumina slurry and from fusing together with the alumina slurry in the process according to the present invention. That is, a highly pure ceramic shell 13 can be formed on the surface of the fly ash 11 and a high quality ceramic foam 10 of a hollow particle having two layers in and out can be produced.

Preferably, air is introduced into the furnace, for example, with the amount of 100 mL/minute per amount of the granulated fly ash 2.0 g while the dried granulated particles is sintered in the furnace, thereby gaseous impurities are prevented from adhereing to the surface of the granulated particle during the sintering and the formation of the ceramic shell 13 can be effectively promoted.

The aforementioned preferred embodiments are described to aid in understanding the present invention and variations may be made by one skilled in the art without departing from the spirit and scope of the present invention.

What is claimed is:

1. A process for producing a ceramic foam comprising steps of:
    coating the surface of raw fly ash material containing impurities with alumina slurry;
    granulating the coated fly ash; and
    sintering the granulated fly ash in a manner that the granulated fly ash is heated in a furnace with rising temperature, then kept at a predetermined temperature for more than one hour, and then cooled down to room temperature,
    whereby the impurities are sealed inside the fly ash not to transfer to the outside so that the surface of the fly ash is covered up with a ceramic shell to form the ceramic foam having an inner layer and an outer layer.

2. The process for producing a ceramic foam according to claim 1, wherein, during the step of sintering, a rate of the rising temperature is about 5° C./minute, the predetermined temperature ranges from about 1350° C. to about 1460° C., the number of hours is about three hours, and a rate of the slow cooling is about 5° C./minute.

3. The process for producing a ceramic foam according to claim 1, wherein, during the step of sintering, air is introduced into the furnace in the amount of about 100 mL/minute for each 2.0 g of the granulated fly ash.

4. The process for producing a ceramic foam according to claim 2, wherein, during the step of sintering, air is introduced into the furnace in the amount of about 100 mL/minute for each 2.0 g of the granulated fly ash.

5. The process for producing a ceramic foam as claimed in any one of claims 1–4, wherein the alumina slurry has a composition consisting of about 65–70 wt % of aluminum oxide, about 2–3 wt % of ammonium polycarboxylate as a dispersing agent, about 2–3 wt % of acrylic emulsion as a binder, and about 25–30 wt % of ion exchanger.

6. The process for producing a ceramic foam according to claim 1, wherein the inner layer comprises the fly ash and the outer layer comprises the ceramic shell.

7. The process for producing a ceramic foam according to claim 6, wherein the inner layer is hollow.

\* \* \* \* \*